Patented Sept. 8, 1953

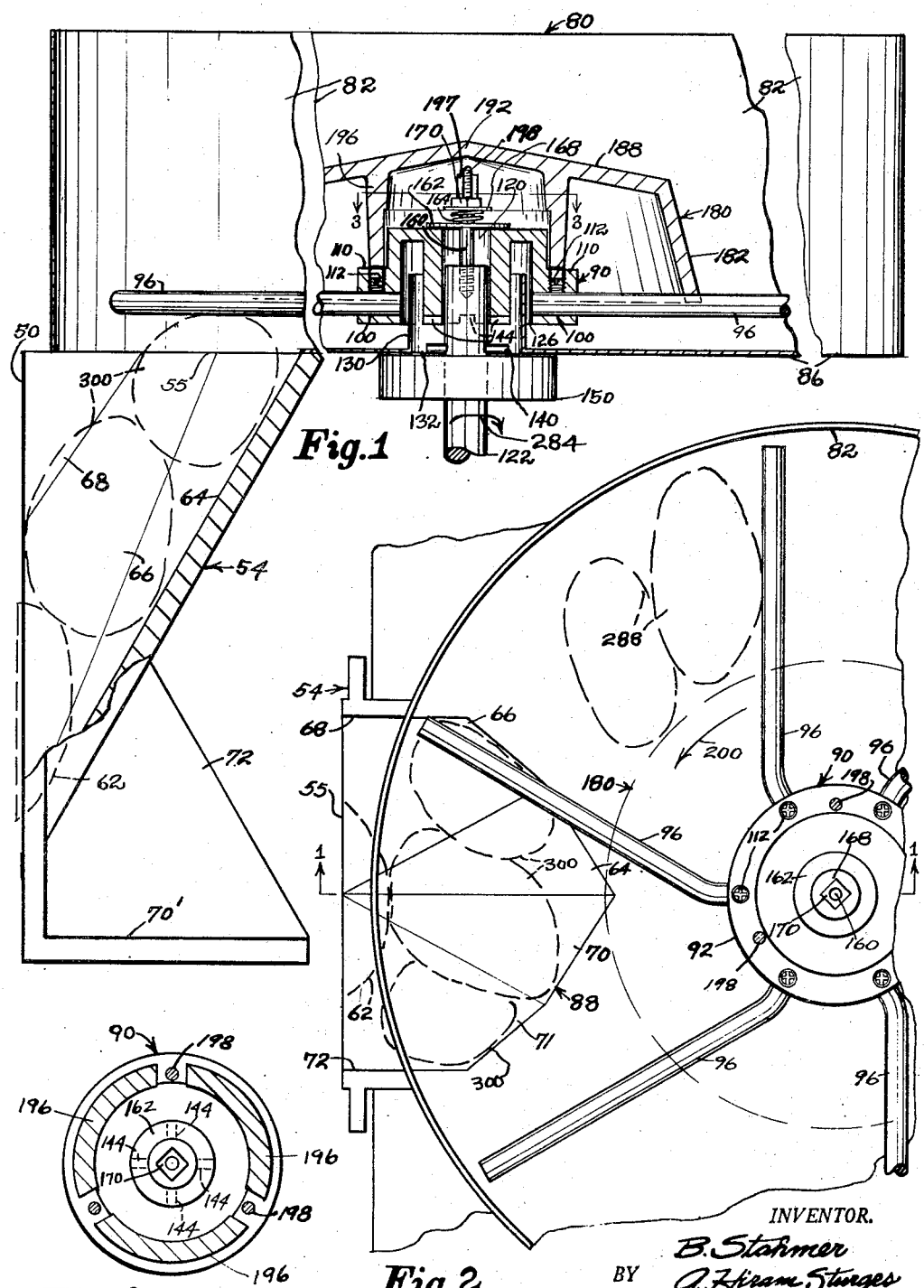

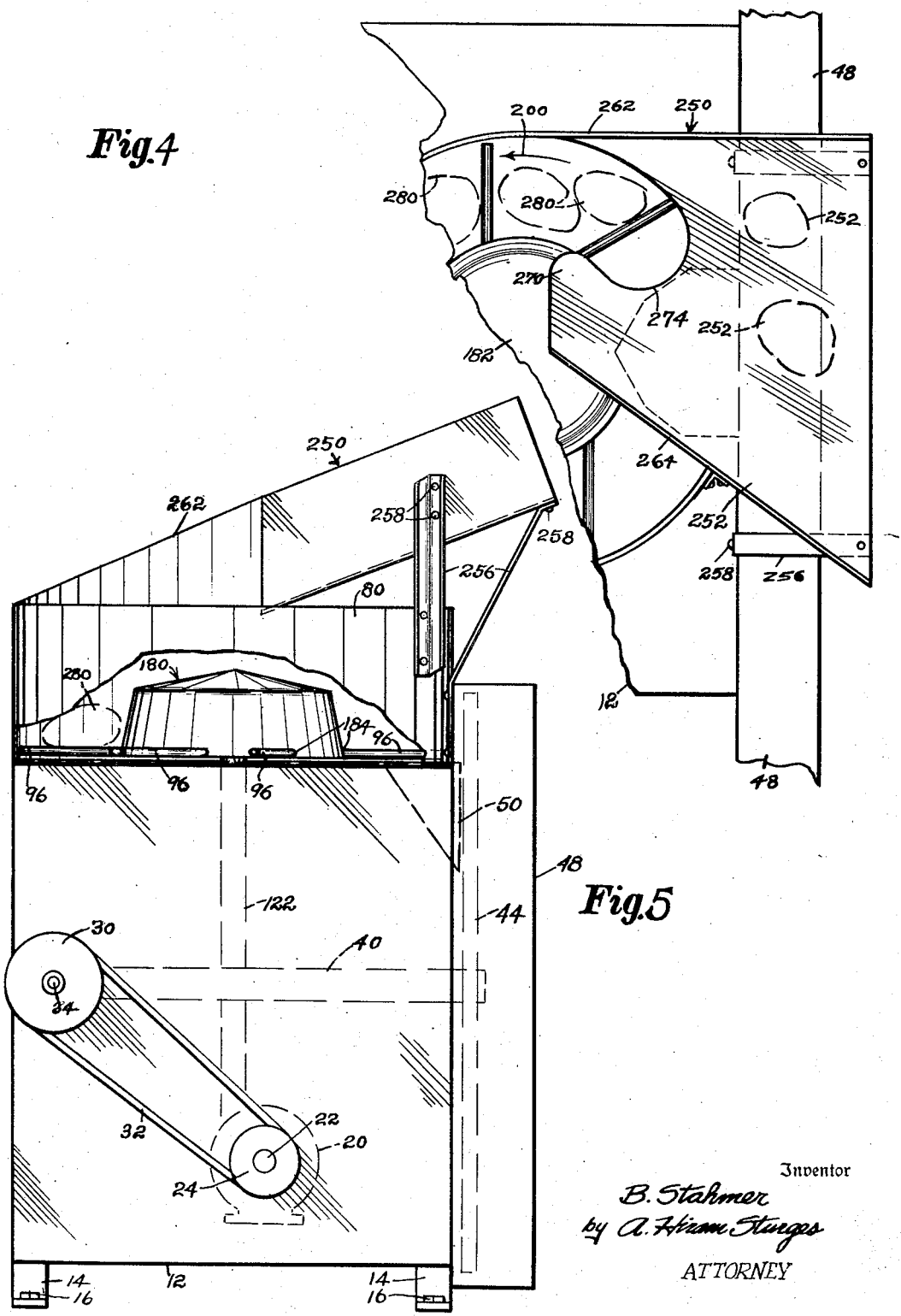

2,651,435

UNITED STATES PATENT OFFICE 2,651,435

FEED MECHANISM FOR POTATO CHIP MACHINES

Bernhardt Stahmer, Omaha, Nebr.

Application April 12, 1950, Serial No. 155,527

2 Claims. (Cl. 222—9)

This invention relates to potato chip machines of the type having rotating knife carriers and more particularly it is an object of this invention to provide an improved feed mechanism for such machines.

In the past the delivery of potatoes to a feed chute of a potato chip machine has been a problem. This is especially so because of jamming and interrupted flow.

It is therefore an object of this invention to provide a feed mechanism adapted to cause potatoes to flow more evenly to the feed chute of such machines.

More particularly it is an object of this invention to provide an improved feed mechanism for use with a potato chip machine of the type described in the applicant's co-pending patent application 35,611 titled "Eccentric Knife Potato Slicer," filed June 28, 1948, and invented by Bernhardt Stahmer, now Patent No. 2,567,248.

Another object of the invention is to provide a feed mechanism employing a spider for delivering potatoes to the chute.

Still another object is to provide a spider having a slip clutch whereby the spider can stop without damage to the machine at times when potatoes in the chute interrupt its rotation.

Still another object is to provide a spider having a cover which is adapted to guide potatoes falling thereon outwardly to positions between its arms.

Yet another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

In the drawings:

Figure 1 is a side elevation of the potato hopper of this invention shown with the feed mechanism therein, a half of the cover, of the clutch, and of the hopper, being broken away for illustration. The hopper of Figure 1 being shown disposed above a feed chute such as could be used with the above described patent application, the feed chute of Figure 1 being best described in another of the applicant's co-pending applications, which latter is titled "Feed Chute for Potato Chip Machine," filed March 22, 1950, Serial Number 151,230. Potatoes in the hopper are shown in dotted lines.

Figure 2 is a top plan view of a portion of the feed mechanism of Figure 1, the hopper and the feed chute. Potatoes in the hopper and in the chute are shown in dotted lines.

Figure 3 is a view-in-section taken along the line 3—3 of Figure 1.

Figure 4 is a top plan view of a portion of the feed mechanism of this invention, including its ramp, potatoes being shown in dotted lines.

Figure 5 is a side elevation of a potato chip machine shown with the feed mechanism of this invention attached thereto, a portion of the hopper being broken away for showing the spider therein, a potato being shown in dotted lines.

The feed mechanism of this invention is for application to a potato chip machine, as best seen in Figure 5.

The machine shown in Figure 5 is similar to those described in the aforementioned patent application. Such a machine includes a main housing 12 supported by legs 14 secured to the floor by bolts 16. Inside the housing 12 a motor is provided as indicated in dotted lines at 20.

The motor 20 is provided with a driving shaft 22 which latter protrudes outwardly of the housing 12. The shaft 22 is secured to a drive pulley 24 and the latter is driveably secured to a driven pulley 30 by means of a belt 32.

The driven pulley is arranged on a shaft 34. The shaft 34 is driveably secured by means not shown to two knife carrier drive shafts, one of which is indicated in dotted lines at 40 in Figure 5. Each drive shaft 40 is rotatably mounted in the machine and is driveably secured to one of two knife carrying paddle members 44, best described in the applicant's previously mentioned pending application.

The two knife carriers, which are here indicated only by the dotted line 44, rotate in the same vertical plane and are shielded by a knife carrier housing 48. The knife carrier 44 passes by the open side 50 of a feed chute generally indicated at 54. The feed chute 54 has an upper entrance opening 55 which is disposed in a horizontal plane for receiving potatoes downwardly therethrough.

As each end of each knife carrier 44 passes by the feed chute opening 50, a chip is skived from a potato in the chute. A potato in position for skiving is indicated in dotted lines at 62 in Figure 1. The potato 62 has been skived to such an extent that it is but half of its original size.

The interior of the chute 54 is provided with downwardly inclining inner walls 64 and 66 and is further provided with two parallel upright walls, one of which is indicated at 68 in Figure 1. It will be understood that as the potatoes pass downwardly through the chute 54 they begin to extend beyond the opening 50. As a potato is skived and becomes smaller, it slides by gravity into the position of the potato 62 in Figure 1.

The chute 54 is provided with a foot portion 70' and a supporting web 72. Since the chute 54 forms no part of the present invention, these parts are only shown in Figure 1.

In accordance with this invention a hopper is provided as generally indicated at 80 in Figure 1. The hopper 80 is provided with a circular, upstanding outer wall 82 and is further provided with a horizontal lower wall 86.

The bottom wall 86 of the hopper is provided with an opening 88 therethrough, the edges of which terminate at the juncture between the walls of the chute 54 and the bottom wall 86. As thus described, the opening 88 has a plurality of edges facing and adjoining the walls 64, 66, and 68 and adjoining the opposite chute walls 70, 71, and 72.

Potatoes falling into the hopper 80 are moved toward the opening 88 by means of a spider generally indicated at 90. The spider 90 is provided with a hub 92 and has a plurality of outwardly extending spaced apart arms 96.

Each arm 96 is disposed in a bore 100 in the hub 90. The exterior of the hub 90 is step-cut for providing ledge 110 on its outer side through which set-screws 112 are threadedly disposed. The screws 112 press against the arms 96 holding them in place.

The hub 90 is provided with a central bore 120 extending upwardly therethrough for the purpose of receiving a drive shaft 122. The hub 90 is further provided with an annular recess 126 extending upwardly thereinto from the bottom thereof. The recess 126 is concentric with the bore 120 and is for the purpose of receiving an upwardly extending circular flange 130. The flange 130 is attached to the bottom wall 86 surrounding a circular opening 132 in the bottom wall 86.

A transverse member or pin 140 is disposed transversely through the shaft 122 and is firmly secured thereto. The pin 140 is preferably provided with rounded upper surfaces or is of cylindrical shape. The pin 140 preferably protrudes outwardly on both sides of the shaft 122.

The purpose of the pin 140 is to engage in recesses 144 which latter extend upwardly into the lower side of the hub 90 between the annular recess 126 and the bore 120. The recesses 144 are preferably radially disposed outwardly from the center of the bore 120. The recesses 144 are preferably four in number, being arranged in two pairs, the recesses of each pair being disposed in alignment with each other and being disposed at a right angle with respect to the recesses 144 of the other pair.

A disc 150 is provided on the shaft 122 beneath the bottom wall 86. The upper side of the disc 150 overlaps the edges of the opening 132 providing a surface against which the lowermost edges of the central portion of the hubs 90 can rest.

A screw 160 is threadedly secured in the upper end of the shaft 122. The purpose of the screw 160 is to receive a washer 162 which latter bears against the top of the hub 90, being pushed downwardly by a spring 164. The spring 164 bears against a second washer 168 at its upper end and the latter is prevented from moving upwardly with respect to the screw 160 by a nut 170 threadedly secured to the upper end of the screw 160.

The spider is further provided with a cover portion 180. The cover 180 is provided with a substantially upright circular outer wall 182. The wall 182 is provided with a plurality of notches in the bottom thereof, the notches 184 being for the purpose of receiving the arm 96. The cover 180 is approximately dome-shaped and is provided with a circular upper surface 188 which latter has a concave under side and is adjoined at its outer end to the wall 182. The wall 188 is inclinedly disposed extending upwardly to a point 192 at its upper end.

Inside the cover 180 is an annular downwardly extending interior wall portion 196. The portion 196 is provided with a circular, preferably horizontal, lower edge which latter rests upon the shoulder 110 of the hub 90 and has notches 197 therein for receiving screws 198, which latter secure the cover 180 to the hub 90. As best seen in top plan view in Figure 2, the arms 96 are not axially disposed. Their innermost ends are axially disposed; however, adjacent the hub 90 each arm is bent to the rearward with respect to the direction of rotation 200 of the spider 90. The direction 200 is indicated by the arrow in Figure 2.

As best seen in Figure 4, a ramp generally indicated at 250 is provided for delivering potatoes 252 downwardly to the spider 90. The ramp 250 is provided with a lower wall 252 inclinedly disposed with respect to the vertical. The ramp is held in place by braces 256 and screws 258, the braces being secured to the hopper 80 and ramp 250.

The ramp 250 is provided with an upright sidewall 262 which latter is adjoined to the outer wall 82 of the hopper 80. The upper edge of the wall 262 is inclinedly disposed with respect to the vertical and horizontal, converging downwardly to the side wall 82. The ramp 250 is further provided with an opposite side wall 262. The side wall 264 is also upstanding and is inclinedly disposed with respect to the wall 250, converging toward the latter at its inner end.

The bottom 270 of the ramp 250 is provided with a recess 274 entering thereinto from the inner side thereof adjacent the wall 250. The purpose of the recess 72 is for permitting potatoes 252 to drop therethrough downwardly into the space between the spider cover 180 and the side wall 82 of the hopper.

As thus described, potatoes are delivered to the ramp 250 by any suitable means, not shown, rolling down the ramp 252 to the spider 180. Potatoes falling on the cover 182 of the spider are guided by an inclinedly disposed upper surfaces downwardly into the space occupied by the potatoes indicated in dotted lines at 280. The potatoes are then carried around the edge of the hopper in the direction of the arrow 200 due to the rotation of the shaft 122 in the direction of the arrow 284 shown in Figure 1.

The potatoes pass through the positions indicated at 288 in Figure 2 and eventually fall downwardly into the chute 54, as indicated by the potatoes 300 in the chute.

When one or more of the potatoes 300 protrudes upwardly from the chute 54, as illustrated by the uppermost potato in Figure 1, the latter will cause the spider to stop rotation in the following manner. The arms striking the potatoes in the chute will tend to climb up its inclined side in the process of its own rotation. This will cause the hub 90 to move upwardly. In another sense, the uppermost potato 300 will stop rotation of the spider 90, causing the rounded transverse pin 140 to move outwardly from the recesses 144. These actions cause the compression of the spring 164 and the upward movement of the spider.

When the spider moves upwardly, it is no longer in engagement with the pin 140 and rotation ceases. As lowermost potatoes in the chute 54 are consumed, the uppermost potato shown in Figure 1 will move downwardly, again permitting the spider to rotate.

This invention has provided a feed mechanism for potato chip machines which is adapted to cause potatoes to move toward a potato chute at a more even rate of flow than heretofore.

From the foregoing description, it is thought to be obvious that a feed mechanism for potato chip machine constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A potato feeder comprising a potato hopper having inlet and outlet openings, a feed chute having an entrance opening, said hopper outlet opening being in communication with said feed chute entrance opening, said hopper having a bottom wall; a rotatable shaft having an end extending into said hopper; at least one member transversely disposed with respect to said shaft and attached to the end thereof; a spider rotatably secured in said hopper above said bottom wall, the arms of said spider passing across said outlet opening during rotation, said spider having a hub portion, said hub portion having a bore therethrough rotatably receiving said shaft, said hub portion having a recess therein normally receiving said transverse member, said recess opening downwardly, and said recess being sufficiently shallow and said transverse member and the walls of said recess being so shaped that when potatoes clogging said chute cause said spider to cease rotation said transverse member escapes from said recess rotating independently of said hub.

2. A device as claimed in claim 1, further including resilient means for urging said hub downwardly.

BERNHARDT STAHMER.

References Cited in the file of this patent

UNITED STATES PATENTS

| Number | Name | Date |
|---|---|---|
| 479,637 | Everett | July 26, 1892 |
| 1,639,370 | Flegel | Aug. 16, 1927 |
| 2,492,260 | Bingham | Dec. 27, 1949 |
| 2,498,515 | Wagner | Feb. 21, 1950 |

FOREIGN PATENTS

| Number | Country | Date |
|---|---|---|
| 301,180 | Italy | Sept. 28, 1932 |